United States Patent
Zheng et al.

(10) Patent No.: US 11,258,143 B2
(45) Date of Patent: *Feb. 22, 2022

(54) BATTERY MODULE, SECONDARY BATTERY AND CAP ASSEMBLY THEREOF

(71) Applicant: CONTEMPORARY AMPEREX TECHNOLOGY CO., LIMITED, Ningde (CN)

(72) Inventors: Yulian Zheng, Ningde (CN); Chengyou Xing, Ningde (CN); Peng Wang, Ningde (CN); Guowei Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/138,586

(22) Filed: Dec. 30, 2020

(65) Prior Publication Data

US 2021/0119308 A1 Apr. 22, 2021

Related U.S. Application Data

(63) Continuation of application No. 16/730,854, filed on Dec. 30, 2019.

(30) Foreign Application Priority Data

Apr. 26, 2019 (CN) .......................... 201920589861.6

(51) Int. Cl.
*H01M 50/543* (2021.01)
*H01M 50/15* (2021.01)
(Continued)

(52) U.S. Cl.
CPC ....... *H01M 50/543* (2021.01); *H01M 50/103* (2021.01); *H01M 50/15* (2021.01);
(Continued)

(58) Field of Classification Search
CPC combination set(s) only.
See application file for complete search history.

(56) References Cited

U.S. PATENT DOCUMENTS

| 2015/0270666 A1* | 9/2015 | Callicoat ................ H01R 25/16 439/627 |
| 2016/0260954 A1 | 9/2016 | Kim et al. |

(Continued)

FOREIGN PATENT DOCUMENTS

| CN | 205723741 U | 11/2016 |
| CN | 207353302 U | 5/2018 |

(Continued)

OTHER PUBLICATIONS

Contemporary Amperex Technology Co., Limited, Extended European Search Report, EP 19220159.8, dated Jun. 25, 2020, 7 pgs.

(Continued)

*Primary Examiner* — Ula C Ruddock
*Assistant Examiner* — Sarika Gupta
(74) *Attorney, Agent, or Firm* — Morgan, Lewis & Bockius LLP

(57) ABSTRACT

The present disclosure provides a battery module, a secondary battery and a cap assembly thereof. The cap assembly includes a cap plate which is provided with a terminal hole and an electrode terminal provided to the cap plate and covering the terminal hole; the electrode terminal includes an outer surface; the electrode terminal includes a positioning hole which is recessed with respect to the outer surface and includes a first portion and a second portion, the second portion is positioned to a side of the first portion away from (Continued)

the outer surface; a section of the first portion parallel to a central axis of the positioning hole is trapezoidal; a size of the first portion gradually decreases in a direction of the first portion close to the second portion, and a minimum size of the first portion is greater than or equal to a size of the second portion.

20 Claims, 5 Drawing Sheets

(51) Int. Cl.
      *H01M 50/172*     (2021.01)
      *H01M 50/528*     (2021.01)
      *H01M 50/502*     (2021.01)
      *H01M 50/516*     (2021.01)
      *H01M 50/103*     (2021.01)
      *H01M 50/553*     (2021.01)
      *H01M 50/188*     (2021.01)
      *H01M 50/557*     (2021.01)

(52) U.S. Cl.
      CPC ....... *H01M 50/172* (2021.01); *H01M 50/188* (2021.01); *H01M 50/502* (2021.01); *H01M 50/516* (2021.01); *H01M 50/528* (2021.01); *H01M 50/553* (2021.01); *H01M 50/557* (2021.01)

(56) References Cited

U.S. PATENT DOCUMENTS

2017/0352846 A1    12/2017   Li et al.
2019/0115611 A1*   4/2019   Wakimoto .......... H01M 50/543

FOREIGN PATENT DOCUMENTS

| | | | |
|---|---|---|---|
| CN | 108767143 A | 11/2018 | |
| CN | 208622794 U | 3/2019 | |
| EP | 3416213 A2 * | 12/2018 | .......... H01M 50/172 |
| EP | 3471166 A1 | 4/2019 | |
| JP | 2002124218 A | 4/2002 | |

OTHER PUBLICATIONS

Zheng, Final Office Action, U.S. Appl. No. 16/730,854, dated Jul. 26, 2021, 22 pgs.

* cited by examiner

BATTERY MODULE, SECONDARY BATTERY AND CAP ASSEMBLY THEREOF

CROSS-REFERENCE TO RELATED APPLICATIONS

This application is a continuation application of U.S. patent application Ser. No. 16/730,854, filed on Dec. 30, 2019, which claims priority to Chinese Patent Application No. 201920589861.6, filed with the State Intellectual Property Office of the People's Republic of China on Apr. 26, 2019, all of which are incorporated herein by reference in their entirety.

TECHNICAL FIELD

The present disclosure relates to the field of battery, and particularly to a secondary battery, a battery module and an electric apparatus.

BACKGROUND

A secondary battery has the advantages of high energy density, long service life, energy saving, environmental protection and the like, and is widely applied in various fields, such as new energy vehicles and energy storage power stations. When the plurality of secondary batteries are assembled, it generally needs to use a busbar to connect the plurality of secondary batteries in series or in parallel. The busbar is generally welded to an electrode terminal of the secondary battery; however, in the prior art, the positioning accuracy of the electrode terminal and the busbar is worse during welding, resulting in deviation of the welding position of the busbar, insufficient welding strength, and failure of the battery module.

SUMMARY

A cap assembly for a secondary battery comprises a cap plate and an electrode terminal; the cap plate is provided with a terminal hole, the electrode terminal is provided to the cap plate and covers the terminal hole; the electrode terminal comprises an outer surface; the electrode terminal comprises a positioning hole, the positioning hole is recessed with respect to the outer surface of the electrode terminal and comprises a first portion and a second portion, the second portion is positioned to a side of the first portion away from the outer surface; a section of the first portion parallel to a central axis of the positioning hole is trapezoidal; a size of the first portion gradually decreases in a direction of the first portion close to the second portion, and a minimum size of the first portion is greater than or equal to a size of the second portion.

The secondary battery comprises an electrode assembly, a case and the cap assembly described above; the electrode assembly is received in the case, the cap plate of the cap assembly is connected to the case, the electrode terminal is provided to a side of the cap plate away from the electrode assembly.

A battery module comprises the secondary battery described above and a busbar; the busbar is connected to the electrode terminal, and the busbar comprises a through hole aligned with the positioning hole of the electrode terminal in a height direction; the through hole exposes the first peripheral surface, and a ratio of an exposed area of the first peripheral surface to a total area of the first peripheral surface is greater than ⅔.

Another embodiment of this application provides an electric apparatus including the aforementioned secondary battery.

Figure 1:
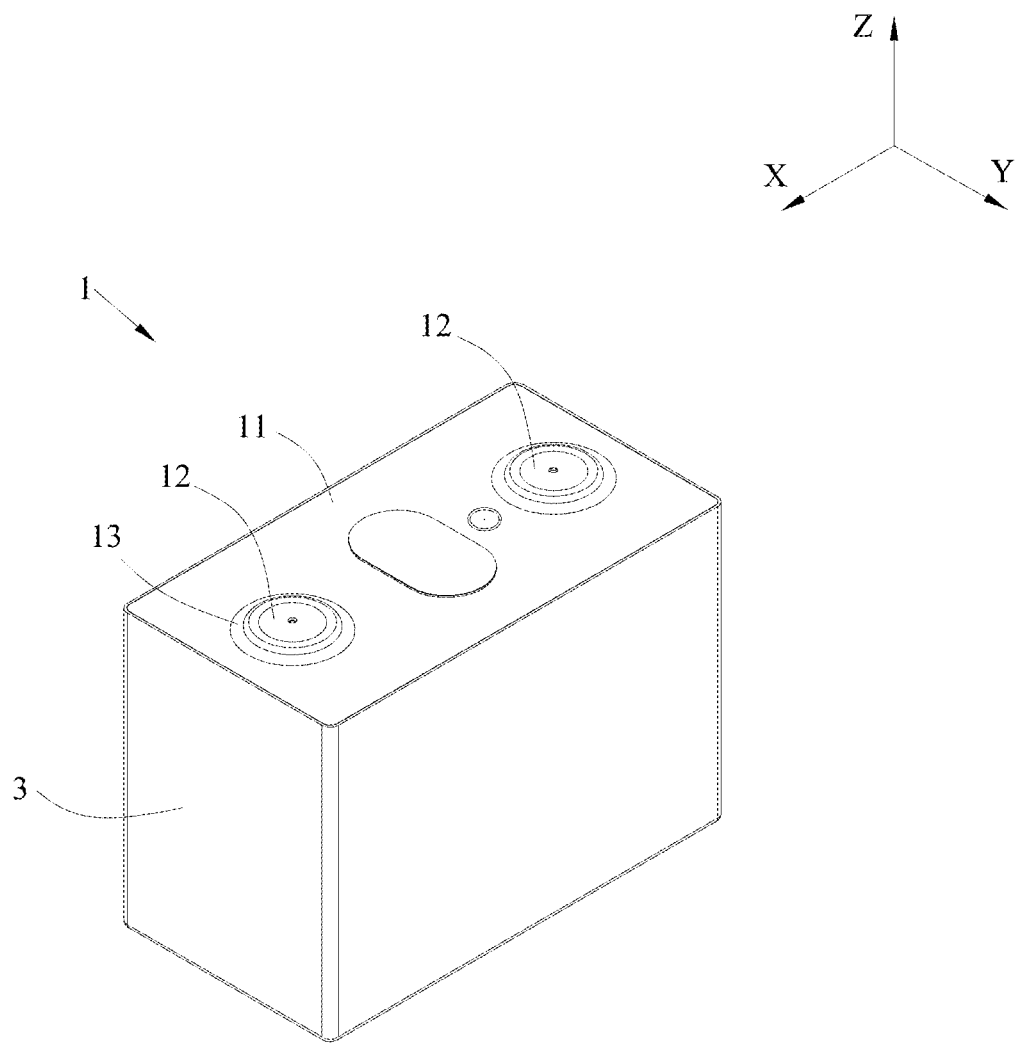
FIG. 1 is a schematic view of a secondary battery according to the present disclosure.

REFERENCE NUMERALS IN FIGURES ARE REPRESENTED AS FOLLOWS 1 cap assembly
11 cap plate
111 terminal hole
12 electrode terminal
121 outer surface
121$a$ first region
121$b$ second region
122 positioning hole
122$a$ first portion
122$b$ second portion
122$c$ first peripheral surface
122$d$ second peripheral surface
122$e$ third portion
122$f$ third peripheral surface
122$g$ bottom surface
123 first terminal plate
124 second terminal plate
13 fixing member
131 fixing piece
132 insulating member
14 connecting piece
141 bulging portion
2 electrode assembly
3 case
4 busbar
41 through hole
X length direction
Y width direction
Z height direction

DETAILED DESCRIPTION

To make the object, technical solutions and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and "third" are only used for illustrative purposes and are not to be construed as expressing or implying a relative importance. The term "plurality" is two or more.

Unless otherwise defined or described, the term "connect" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present disclosure will be further described in detail in combination with the exemplary embodiments and the figures.

Figure 7:
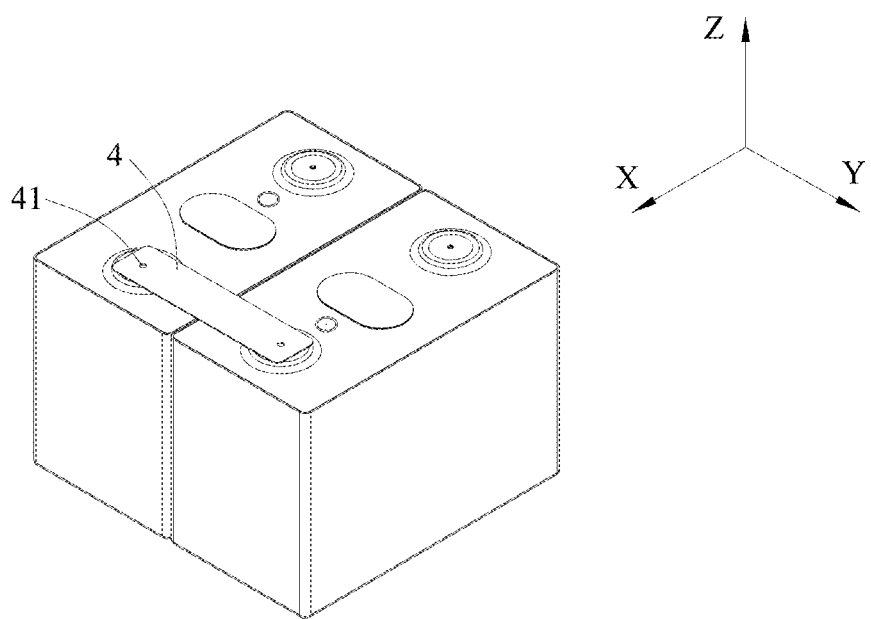
FIG. 7 is a schematic view of a battery module according to the present disclosure.
Figure 8:
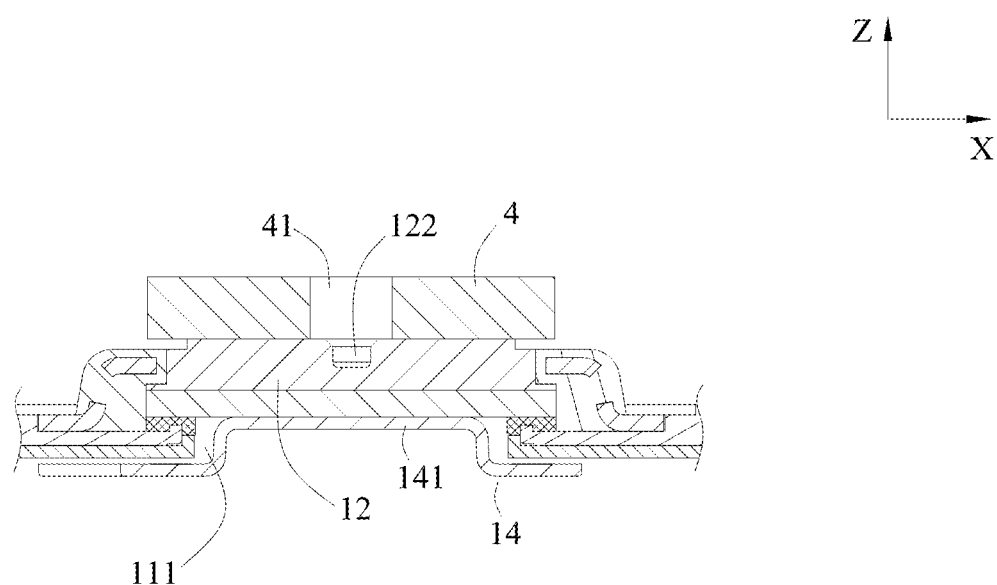
FIG. 8 is a schematic view showing connection of the secondary battery with a busbar.

Referring to FIG. 7, a battery module of the present disclosure may include a plurality of secondary batteries. The secondary batteries may be columnar prismatic lithium-ion batteries. The plurality of secondary batteries may be arranged sequentially in a width direction Y.

The battery module may further include an end plate and a side plate. The end plate is provided as two in number and the two end plates are respectively provided to both ends of the plurality of secondary batteries in the width direction Y. The side plate is provided as two in number and the two side plates are respectively provided to both sides of the plurality of secondary batteries in a length direction X. The end plates and the side plates are connected together to form a rectangular frame, the frame fixes the plurality of secondary batteries.

Figure 2:
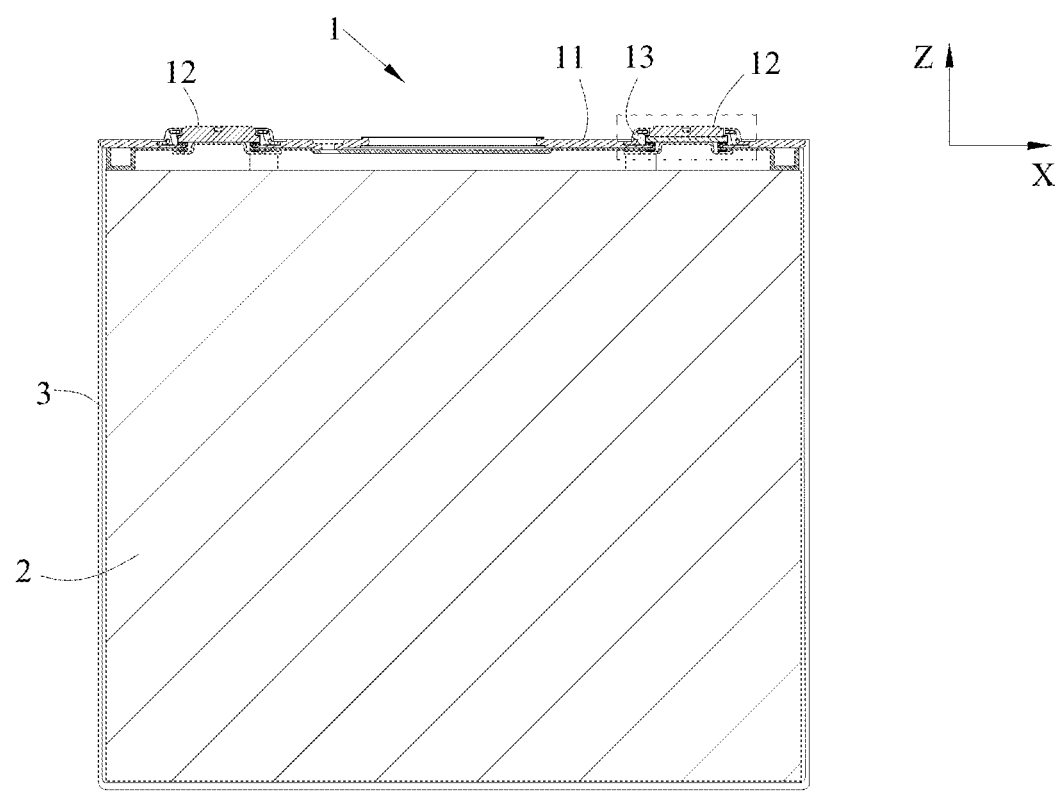
FIG. 2 is a cross-sectional view of the secondary battery according to the present disclosure.
Figure 3:
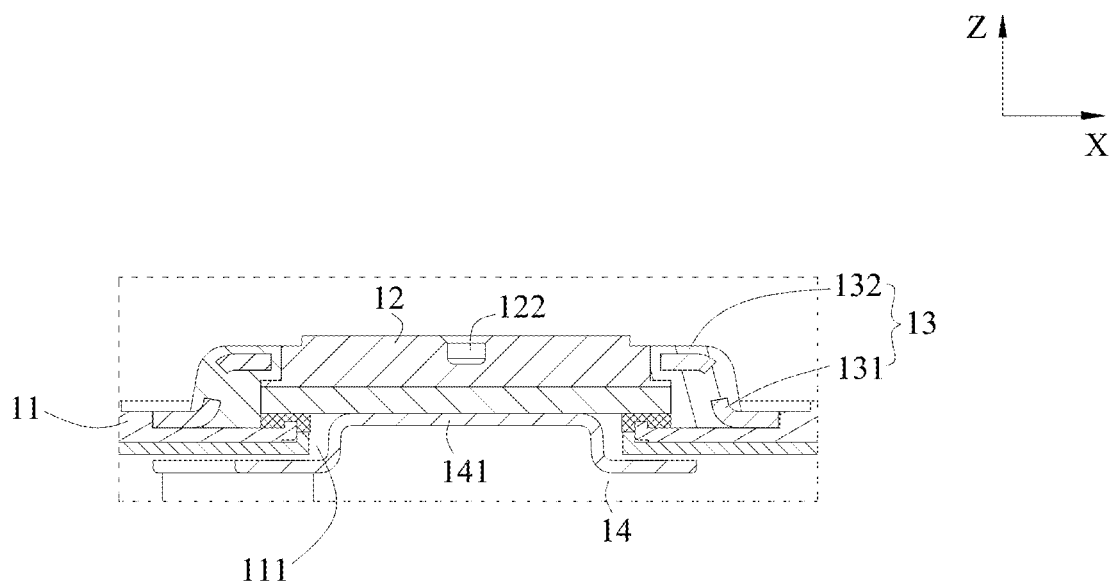
FIG. 3 is an enlarged view of FIG. 2 indicated by a block.

Referring to FIG. 1 and FIG. 2, the secondary battery of the present disclosure may include a cap assembly 1, an electrode assembly 2 and a case 3.

The electrode assembly 2 is a core member for achieving charge and discharge function of the secondary battery. The electrode assembly 2 includes a positive electrode plate, a negative electrode plate and a separator, the separator separates the positive electrode plate and the negative electrode plate. The positive electrode plate includes a positive current collector and a positive active material layer coated on a surface of the positive current collector, the positive current collector may be an aluminum foil, the positive active material layer includes a ternary material, lithium manganese oxide or lithium iron phosphate. The negative electrode plate includes a negative current collector and a negative active material layer coated on a surface of the negative current collector, the negative current collector may be a copper foil, the negative active material layer includes graphite or silicon.

The electrode assembly 2 may be a winding structure. Specifically, both the positive electrode plate and the negative electrode plate each are provided as one in number, and the positive electrode plate and the negative electrode plate are belt-shaped structures. The positive electrode plate, the separator and the negative electrode plate are sequentially stacked and wound to two or more turns to form the electrode assembly 2. In the manufacturing process of the electrode assembly 2, the electrode assembly 2 may be firstly wound into a hollow cylindrical structure, and then the electrode assembly 1 is pressed to a flat shape after winding.

Alternatively, the electrode assembly 2 may be a laminated structure. Specifically, the positive electrode plate is provided as plurality in number, the negative electrode plate is provided as plurality in number, the plurality of positive electrode plates and negative electrode plates are alternately laminated, the separator separates the positive electrode plates and the negative electrode plates.

The case 3 may have a hexahedron shape or other shape. A receiving cavity is formed inside the case 3 to receive the electrode assembly 2 and an electrolyte. An opening is formed at an end of the case 3, and the electrode assembly 2 is placed into the receiving cavity of the case 3 via the opening. The case 3 may be made of a conductive metal, in some examples, the case 3 is made of aluminum or aluminum alloy.

The cap assembly 1 includes a cap plate 11 and an electrode terminal 12. The cap plate 11 is provided to the case 3 and covers the opening of the case 3, thereby sealing the electrode assembly 2 within the case 3. The cap plate 11 may be a metal plate and connected with the case 3 by welding.

The cap plate 11 is provided with two terminal holes 111 which pass through the cap plate 11. The electrode terminal 12 is provided as two in number and provided on an upper side of the cap plate 11 in a height direction Z, that is, a side of the cap plate 11 away from the electrode assembly 2. Each electrode terminal 12 covers one corresponding terminal hole 111. A sealing ring is provided between the cap plate 11 and the electrode terminal 12, and the sealing of the terminal hole 111 is achieved by compressing the sealing ring.

The cap assembly 1 further includes a fixing member 13 and a connecting piece 14, the fixing member 13 fixes the electrode terminal 12 on the cap plate 11. The connecting piece 14 is provided as two in number, one connecting piece 14 connects one electrode terminal 12 and the positive electrode plate of the electrode assembly 2, and the other connecting piece connects the other electrode terminal 12 and the negative electrode plate of the electrode assembly 2. The connecting piece 14 may be provided with a bulging portion 141, the bulging portion 141 extends into the terminal hole 111 and is connected with the electrode terminal 12.

In the battery module, the plurality of secondary batteries may be connected together via the busbar 4. Referring to FIG. 7, one end of the busbar 4 is connected to the electrode terminal 12 of one secondary battery, and the other end of the busbar 4 is connected to the electrode terminal 12 of the other secondary battery, thereby connecting the two secondary batteries in series or in parallel.

The busbar 4 may be fixed to the electrode terminal 12 by laser welding. When welding, the laser acts on a surface of the busbar 4, if the position of the busbar 4 is deviated, it will lead to laser misalignment and poor welding; more seriously, the misaligned laser may directly act on the cap plate 11, causing the cap plate 11 to be fuse through, causing a safety hazard.

The electrode terminal 12 has an outer surface 121 at an end away from the cap plate 11. In some examples, the electrode terminal 12 has a positioning hole 122, the positioning hole 122 is recessed with respect to the outer surface 121 of the electrode terminal 12. Correspondingly, the busbar 4 has a through hole 41 aligned with the positioning hole 122 of the electrode terminal 12 in the height direction Z. A size of the through hole 41 is larger than a size of the positioning hole 122.

When welding, firstly the busbar 4 is placed above the electrode terminal 12 to make the through hole 41 and the positioning hole 122 of the electrode terminal 12 aligned with each other in the height direction Z, and expose the positioning hole 122 to the through hole 4. And then the positioning hole 122 is positioned by using a CCD image sensor.

Specifically, a laser welding device has a CCD taking image and capturing function for finding the location of the desired welding. In Charge Coupled Device (CCD) image sensor, CCD is made of a semiconductor material which is highly light sensitive, converts light into electric charge and converts it into a digital signal through an analog-to-digital converter chip. The digital signal is compressed and then saved by a flash memory or a built-in hard disk card inside a camera, so that the data is easily transmitted to the computer, and the image may be modified as needed and imagination by means of computer processing. The CCD consists of many light sensitive units which are usually mega-pixel units. When the surface of CCD is illuminated by light, a plurality of light sensitive units reflect the electric charges on the components, and signals generated by all the light sensitive units are collected together to form a complete image. The positioning hole 122 is recessed inwardly with respect to the outer surface 121, and therefore, an outline of the positioning hole 122 is displayed in the CCD. Through the computer algorithm, a geometric center of the positioning hole 122 is found, and a welding track is calculated from the geometric center. Finally, the laser welding device performs welding along the calculated welding track.

Therefore, in the present disclosure, the positioning hole 122 helps to improve the positioning accuracy between the electrode terminal 12 and the busbar 4, and improve the welding strength.

However, if the positioning hole 122 is provided as a cylindrical hole, in the image taken by the CCD, a boundary between the positioning hole 122 and the outer surface 121 is a thin line; meanwhile, the busbar 4 may shield a part of the positioning hole 122 due to tolerance. Therefore, the outline of the positioning hole 122 will be not obvious in the CCD, and a proportion of failure by CCD positioning is high, and there is still a risk of welding failure.

Figure 4:
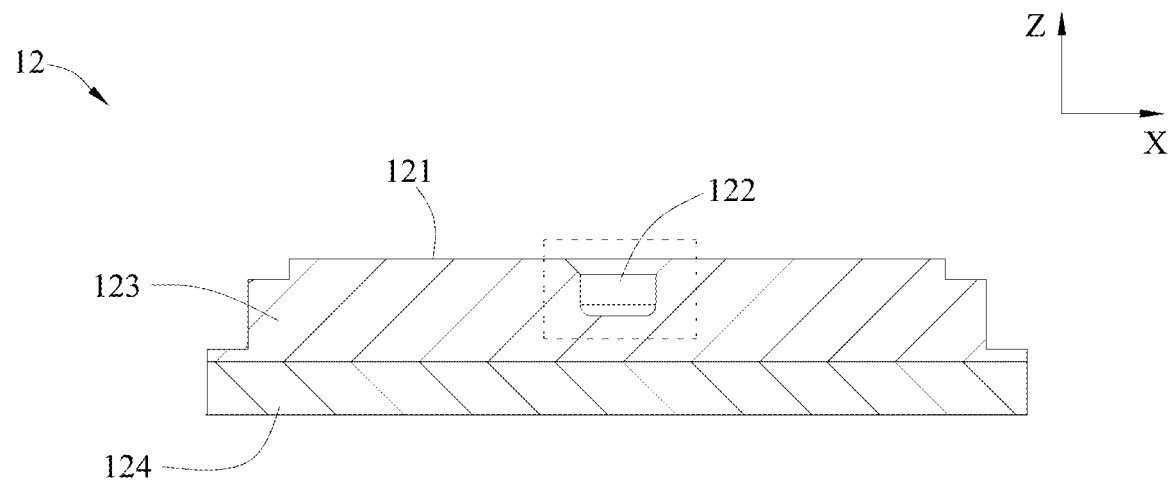
FIG. 4 is a view of an electrode terminal of FIG. 3.
Figure 5:
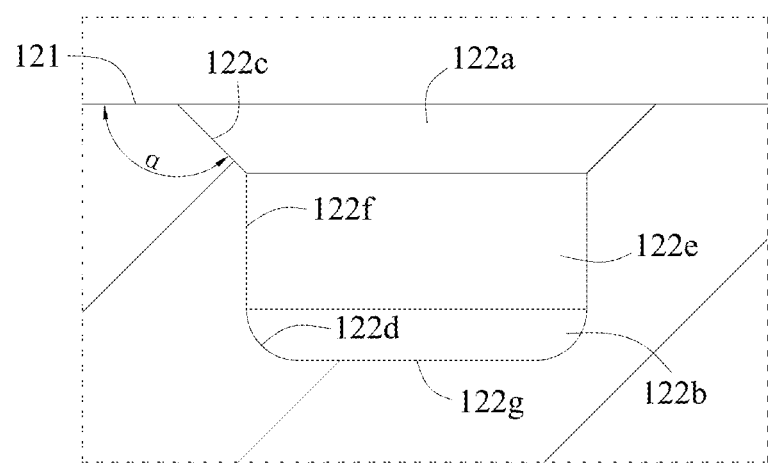
FIG. 5 is an enlarged view of FIG. 4 indicated by a block.
Figure 6:
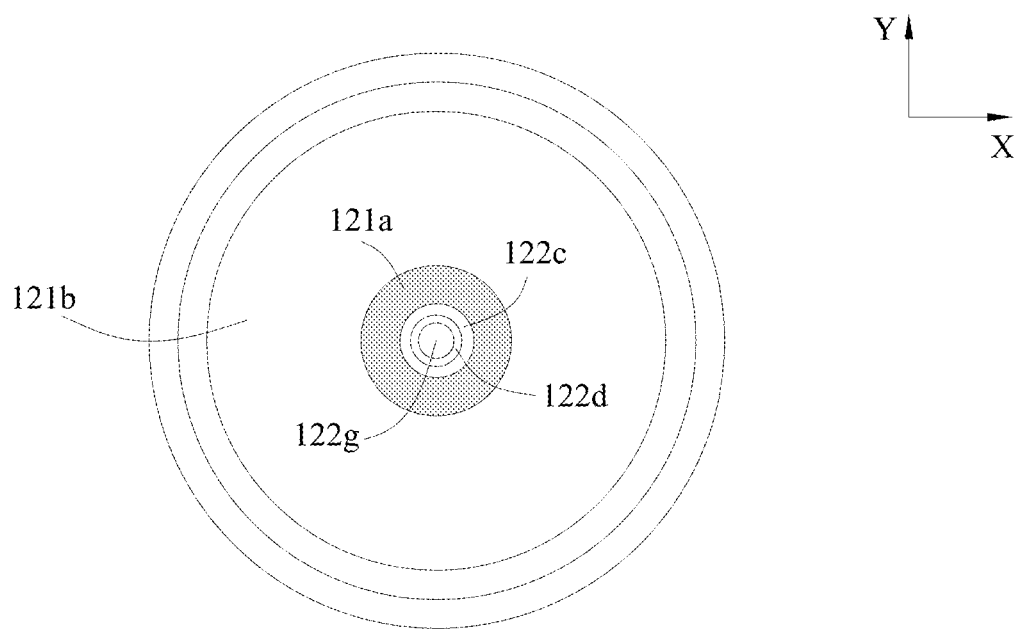
FIG. 6 is a top view of the electrode terminal of FIG. 4.

Therefore, in some examples, referring to FIG. 4 and FIG. 5, the positioning hole 122 includes a first portion 122a and a second portion 122b, the second portion 122b is positioned at a side of the first portion 122a away from the outer surface 121. A section of the first portion 122a parallel to a central axis of the positioning hole 122 is trapezoidal. The second portion 122b has a shape different from the first portion 122a. A size of the first portion 122a gradually decreases in a direction away from the outer surface 121, and a minimum size of the first portion 122a is greater than or equal to a size of the second portion 122b.

In the present disclosure, the first portion 122a is generally a hole which has a large diameter at an outer side and a small diameter at an inner side and has a circular truncated cone shape. The first portion 122a has a first peripheral surface 122c, the second portion 122b has a second peripheral surface 122d, and the first peripheral surface 122c is connected with the second peripheral surface 122d. The positioning hole 122 is a blind hole, a lower end of the second portion 122b in the height direction Z further has a bottom surface 122g.

Compared with a straight hole, the first peripheral surface 122c of the first portion 122a is shown as a ring-shaped region in the image taken by the CCD, and has a large width, which may increase the range of capturing of the CCD. Also, the first peripheral surface 122c is inclined at an angle with respect to the outer surface 121, so in the image taken by the CCD, the first peripheral surface 122c and the outer surface 121 have different color depths, which is convenient for the CCD to find the geometric center of the positioning hole 122 (that is the central axis of the positioning hole 122).

In addition, the positioning hole 122 has the second portion 122b with a smaller size. By configuration of the second portion 122b, the depth of the positioning hole 122 is increased, and the contrast between the first portion 122a and the second portion 122b is increased, further improving the capability of the CCD to capture the first peripheral surface 122c. The CCD accurately calculates the geometric center of the positioning hole 122 according to the outline of the first peripheral surface 122c captured.

In conclusion, the present disclosure makes the CCD device accurately calculate the geometric center of the positioning hole 122 by the configuration of the positioning hole 122 with a specific shape, improve the positioning accuracy between the electrode terminal 12 and the busbar 4, and avoid the laser acting on the cap plate 11, thereby improving the welding strength.

Because the first peripheral surface 122c has a larger width and a darker color in the image taken by the CCD, therefore, even though the busbar 4 shields a part of the positioning hole 122 due to the tolerance, the positioning of the CCD is not affected. That is, the through hole 41 does not need to completely expose the first peripheral surface 122c. Certainly, in order to ensure the positioning accuracy of the CCD, a ratio of an exposed area of the first peripheral surface 122c to a total area of the first peripheral surface 122c should be greater than $2/3$. If an area of the first peripheral surface 122c shielded by the busbar 4 is more than $1/3$ in proportion, even though the first peripheral surface 122c in the image taken by the CCD has the larger width and darker color, the positioning may fail.

Referring to FIG. 5, an angle between the first peripheral surface 122c and the outer surface 121 is a. When the depth of the first portion 122a in the height direction Z is constant, the larger the value of $\alpha$ is, the smaller the inclination of the first peripheral surface 122 is, and the smaller the difference in color between the first peripheral surface 122c and the outer surface 121 in the image taken by the CCD is; however, in the image taken by the CCD, the larger the width of the first peripheral surface 122c is. The smaller the value of $\alpha$ is, the greater the degree of inclination of the first peripheral surface 122, and in the image taken by the CCD, the greater the difference in color between the first peripheral surface 122c and the outer surface 121 is; certainly, in the image taken by the CCD, the smaller the width of the first peripheral surface 122c is. Therefore, in some examples, the value of $\alpha$ is from 135 degrees to 175 degrees, here, the width and color depth of the first peripheral surface 122c in the image taken by the CCD may considered at the same time, and the positioning function is improved.

The positioning hole 122 further includes a third portion 122e, the third portion 122e is cylindrical and is positioned between the first portion 122a and the second portion 122b. The third portion 122e has a third peripheral surface 122f which is cylindrical, the third peripheral surface 122f connects the first peripheral surface 122c and the second peripheral surface 122d. The third portion 122e is a hole with the constant diameter. By configuration of the third portion 122e, a distance between the first portion 122a and the second portion 122b is increased, the light reflection is reduced, the contrast between the first peripheral surface 122c and the second peripheral surface 122d in the image is improved, and the positioning function is improved.

The outer surface 121 includes a first region 121a and a second region 121b, the first region 121a surrounds the first peripheral surface 122c and is connected with the first peripheral surface 122c, and the second region 121b surrounds the first region 121a and is connected with the first region 121a. A roughness of the first region 121a is greater than a roughness of the first peripheral surface 122c.

In the present disclosure, by increasing the roughness of the first region 121a, the contrast between the first region 121a and the first peripheral surface 122c in the image is improved, so that the first peripheral surface 122c is captured by CCD and the positioning performance is improved. Certainly, in order for the CCD to capture the first region 121a, the through hole 41 should expose at least part of the first region 121a.

The roughness of the first region 121a is from 1 µm to 14 µm. If the roughness of the first region 121a is less than 1 µm, the influence of the roughness of the first region 121a on the contrast between the first region 121a and the first peripheral surface 122c in the image is small. If the roughness of the first region 121a is greater than 14 µm, the flatness of the first region 121a may be too poor; when the busbar 4 is attached to the first region 121a and the second region 121b, the stability of the busbar 4 is poor. In some examples, the roughness of the first region 121a is from 1.2 µm to 7 µm.

The busbar 4 may be welded to the second region 121b of the outer surface 121. If the roughness of the second region 121b is too large, when the busbar 4 is welded to the second region 121b, it is easy to cause poor welding. Therefore, a roughness of the second region 121b is less than the roughness of the first region 121a.

A size of the second portion 122b gradually decreases in a direction away from the outer surface 121. The second peripheral surface 122d of the second portion 122b is a circular arc surface.

In the present disclosure, the electrode terminal 12 is provided to a side of the cap plate 11, the electrode terminal 12 does not need to pass through the terminal hole 111 of the cap plate 11, therefore, the electrode terminal 12 may have an smaller thickness. However, in the working process of the secondary battery, gas will be generated inside the case 3, and the gas exerts pressure on the cap plate 11 and the electrode terminal 12. Since the thickness of the electrode terminal 12 is small, the electrode terminal 12 is deformed by the pressure of the gas. However, the pressure is concentrated at the positioning hole 122 of the electrode terminal 12, and if the pressure of the gas is too large, the electrode terminal 12 may be broken. In the present disclosure, a round corner is provided at the bottom of the positioning hole 122 to form the second peripheral surface 122d which is a circular arc surface. The second peripheral surface 122d which is a circular arc surface disperses the stress, and reduce the risk of break of the electrode terminal 12.

The cap assembly 1 further includes the fixing member 13, the fixing member 13 connects the cap plate 11 and the electrode terminal 12, an edge of the electrode terminal 12 is positioned between the fixing member 13 and the cap plate 11.

The fixing member 13 may include a fixing piece 131 and an insulating member 132, the fixing piece 131 may be fixed to the cap plate 11 by welding, and the insulating member 132 is integrated to the fixing piece 131 and separates the fixing piece 131 and the electrode terminal 12. The insulating member 132 may surround the electrode terminal 12, and the edge of the electrode terminal 12 is positioned between the insulating member 132 and the cap plate 11. The insulating member 132 presses the electrode terminal 12 against the cap plate 11 to prevent the electrode terminal 12 from being detached from the cap plate 11.

Certainly, since the edge of the electrode terminal 12 is limited by the insulating member 132, a central region of the electrode terminal 12 provided with the positioning hole 122 is easily deformed to bulge by the pressure of the gas. If the second peripheral surface 122d which is a circular arc surface is not provided, the electrode terminal 12 is easily broken by the pressure of the gas.

The electrode terminal 12 electrically connected with the negative electrode may be a metal composite plate. Specifically, the electrode terminal 12 may include a first terminal plate 123 and a second terminal plate 124. A material of the first terminal plate 123 is different from a material of the second terminal plate 124. In some examples, the first terminal plate 123 is made of aluminum and the second terminal plate 124 is made of copper. The first terminal plate 123 and the second terminal plate 124 is compounded as one by a cold rolling method, a hot rolling method, an explosion compound method or an explosive rolling method and the like in some examples. The first terminal plate 123 is positioned to a side of the second terminal plate 124 away from the cap plate 11.

The use of the second terminal plate 124 which is made of copper facilitate the connection of the second terminal plate 124 with the negative electrode plate. The material of the busbar 4 is usually aluminum, and the first terminal plate 123 made of aluminum facilitate the welding of the first terminal plate 123 and the busbar 4.

The positioning hole 122 is formed to the first terminal plate 123. That is, the depth of the positioning hole 122 is less than a thickness of the first terminal plate 123. This avoids the compounded interface of the first terminal plate 123 and the second terminal plate 124 from being exposed, and prevent the first terminal plate 123 and the second terminal plate 124 from being separated.

In some embodiments, an electric apparatus includes the aforementioned secondary battery.

What is claimed is:

1. A secondary battery, comprising a cap assembly, the cap assembly comprising a cap plate and two electrode terminals;
    the cap plate being provided with two terminal holes, each electrode terminal being provided to the cap plate and covering a corresponding terminal hole;
    the electrode terminal comprising an outer surface;
    the electrode terminal comprising a positioning blind hole, the positioning blind hole being recessed with respect to the outer surface of the electrode terminal and comprising a first portion and a second portion, the first portion having a first peripheral surface of a ring-shaped region being position to an inner side of the outer surface of the electrode terminal and the second portion being positioned to an inner side of the first portion and further away from the outer surface, wherein there is a constant slope difference and a roughness difference between the first peripheral surface and the outer surface of the electrode terminal;
    a section of the first portion parallel to a central axis of the positioning blind hole being trapezoidal; and
    a size of the first portion gradually decreasing in a direction of the first portion close to the second portion whereby the first peripheral surface of the first portion is visually different from the outer surface of the electrode terminal in a top view image of the electrode terminal captured by an electronic image sensor due to the constant slope difference and the roughness difference between the first peripheral surface relative to the outer surface of the electrode terminal.

2. The secondary battery according to claim 1, wherein an angle corresponding to the constant slope difference between the first peripheral surface and the outer surface is within a range from 135 degrees to 175 degrees.

3. The secondary battery according to claim 1, wherein the positioning hole further comprises a third portion, the third portion is cylindrical and is positioned between the first portion and the second portion.

4. The secondary battery according to claim 3, wherein
the outer surface comprises a first region and a second region, the first region surrounds the first peripheral surface and is connected with the first peripheral surface, and the second region surrounds the first region and is connected with the first region;
a roughness of the first region is greater than a roughness of the first peripheral surface.

5. The secondary battery according to claim 4, wherein
a size of the second portion gradually decreases in a direction of the second portion away from the first portion;
the second portion has a second peripheral surface, the second peripheral surface is a circular arc surface.

6. The secondary battery according to claim 4, wherein the roughness of the first region is from 1 μm to 14 μm.

7. The secondary battery according to claim 1, wherein
the outer surface comprises a first region and a second region, the first region surrounds the first peripheral surface and is connected with the first peripheral surface, and the second region surrounds the first region and is connected with the first region;
a roughness of the first region is greater than a roughness of the first peripheral surface.

8. The secondary battery according to claim 1, wherein
a size of the second portion gradually decreases in a direction of the second portion away from the first portion;
the second portion has a second peripheral surface, the second peripheral surface is a circular arc surface.

9. The secondary battery according to claim 1, wherein a shape of the second portion is different from a shape of the first portion.

10. The secondary battery according to claim 1, wherein the electrode terminal comprises a first terminal plate and a second terminal plate, the first terminal plate is positioned to a side of the second terminal plate away from the cap plate;
a material of the first terminal plate is different from a material of the second terminal plate;
the positioning hole is formed to the first terminal plate, and a depth of the positioning hole is less than a thickness of the first terminal plate.

11. The secondary battery according to claim 10, wherein the first terminal plate is made of aluminum and the second terminal plate is made of copper.

12. The secondary battery according to claim 8, wherein the cap assembly further comprises a fixing member, the fixing member connects the cap plate and the electrode terminal, an edge of the electrode terminal is positioned between the fixing member and the cap plate.

13. The secondary battery according to claim 1, wherein the cap assembly further comprises a fixing member, the fixing member connects the cap plate and the electrode terminal, an edge of the electrode terminal is positioned between the fixing member and the cap plate.

14. The secondary battery according to claim 1, wherein the electrode terminal is provided to a side of the cap plate.

15. The secondary battery according to claim 1, wherein the cap assembly further comprises a connecting piece, the connecting piece is provided with a bulging portion, the bulging portion extends into the terminal hole and is connected with the electrode terminal.

16. The secondary battery according to claim 1, wherein the cap assembly further comprises a sealing ring, the sealing ring is provided between the cap plate and the electrode terminal.

17. The secondary battery according to claim 1, further comprising an electrode assembly and a case;
the electrode assembly being received in the case, the cap plate being connected to the case, and the electrode terminal being provided to a side of the cap plate away from the electrode assembly.

18. A battery module, comprising a secondary battery and a busbar;
the secondary battery comprising an electrode assembly, a case and a cap assembly;
the cap assembly comprising a cap plate and two electrode terminals;
the cap plate being provided with two terminal holes, each electrode terminal being provided to the cap plate and covering a corresponding terminal hole;
the electrode terminal comprising an outer surface;
the electrode terminal comprising a positioning blind hole, the positioning blind hole being recessed with respect to the outer surface of the electrode terminal and comprising a first portion and a second portion, the first portion having a first peripheral surface of a ring-shaped region being position to an inner side of the outer surface of the electrode terminal and the second portion being positioned to an inner side of the first portion and further away from the outer surface, wherein there is a constant slope difference and a roughness difference between the first peripheral surface and the outer surface of the electrode terminal;
a section of the first portion parallel to a central axis of the positioning blind hole being trapezoidal;
a size of the first portion gradually decreasing in a direction of the first portion close to the second portion whereby the first peripheral surface of the first portion is visually different from the outer surface of the electrode terminal in a top view image of the electrode terminal captured by an electronic image sensor due to the constant slope difference and the roughness difference between the first peripheral surface relative to the outer surface of the electrode terminal;
the electrode assembly being received in the case, the cap plate of the cap assembly being connected to the case, the electrode terminal being provided to a side of the cap plate away from the electrode assembly;
the busbar being connected to the electrode terminal, and the busbar further comprising a through hole aligned with the positioning blind hole of the electrode terminal in a height direction; and
the through hole of the busbar exposing the first peripheral surface of the first portion in the top view image of the electrode terminal, and a ratio of an exposed area of the first peripheral surface in the top view image to a total area of the first peripheral surface in the top view image being greater than ⅔.

19. The battery module according to claim 18, wherein
the outer surface comprises a first region and a second region, the first region surrounds the first peripheral surface and is connected with the first peripheral surface, and the second region surrounds the first region and is connected with the first region; and the busbar is welded to the second region of the outer surface, the through hole exposes at least part of the first region.

20. An electric apparatus, comprising a secondary battery, the secondary battery comprising a cap assembly, the cap assembly comprising a cap plate and an electrode terminal;

the cap plate being provided with a terminal hole, the electrode terminal being provided to the cap plate and covering the terminal hole;

the electrode terminal comprising an outer surface;

the electrode terminal comprising a positioning blind hole, the positioning blind hole being recessed with respect to the outer surface of the electrode terminal and comprising a first portion and a second portion, the first portion having a first peripheral surface of a ring-shaped region being position to an inner side of the outer surface of the electrode terminal and the second portion being positioned to an inner side of the first portion and further away from the outer surface, wherein there is a constant slope difference and a roughness difference between the first peripheral surface and the outer surface of the electrode terminal;

a section of the first portion parallel to a central axis of the positioning hole being trapezoidal; and a size of the first portion gradually decreasing in a direction of the first portion close to the second portion whereby the first peripheral surface of the first portion is visually different from the outer surface of the electrode terminal in a top view image of the electrode terminal captured by an electronic image sensor due to the constant slope difference and the roughness difference between the first peripheral surface relative to the outer surface of the electrode terminal.

* * * * *